(12) United States Patent
Rampal et al.

(10) Patent No.: US 11,543,663 B2
(45) Date of Patent: Jan. 3, 2023

(54) SYSTEM AND METHOD FOR ALIGNMENT BETWEEN REAL AND VIRTUAL OBJECTS IN A HEAD-MOUNTED OPTICAL SEE-THROUGH DISPLAY

(71) Applicant: CARTOSENSE PVT. LTD., Maharashtra (IN)

(72) Inventors: Hem Rampal, Delhi (IN); Nikhil Chandwadkar, Maharashtra (IN); Bhargava Chintalapati, Telangana (IN)

(73) Assignee: CARTOSENSE PVT. LTD., Maharashtra (IN)

( * ) Notice: Subject to any disclaimer, the term of this patent is extended or adjusted under 35 U.S.C. 154(b) by 107 days.

(21) Appl. No.: 17/055,774

(22) PCT Filed: May 16, 2019

(86) PCT No.: PCT/IN2019/050395
§ 371 (c)(1),
(2) Date: Nov. 16, 2020

(87) PCT Pub. No.: WO2019/220464
PCT Pub. Date: Nov. 21, 2019

(65) Prior Publication Data
US 2021/0208402 A1    Jul. 8, 2021

(30) Foreign Application Priority Data

May 16, 2018  (IN) .............................. 201821018357

(51) Int. Cl.
*G02B 27/01* (2006.01)
*G02B 27/00* (2006.01)
*G06V 40/18* (2022.01)

(52) U.S. Cl.
CPC ..... *G02B 27/0172* (2013.01); *G02B 27/0093* (2013.01); *G06V 40/197* (2022.01);
(Continued)

(58) Field of Classification Search
CPC .................................................. G02B 27/0172
See application file for complete search history.

(56) References Cited

U.S. PATENT DOCUMENTS

| 6,578,962 | B1 * | 6/2003 | Amir | ..................... G06V 40/193 |
| | | | | 345/157 |
| 8,457,352 | B2 * | 6/2013 | Hennessey | .............. G06F 3/013 |
| | | | | 382/103 |

(Continued)

*Primary Examiner* — William Boddie
*Assistant Examiner* — Andrew B Schnirel
(74) *Attorney, Agent, or Firm* — Saliwanchik, Lloyd & Eisenschenk

(57) ABSTRACT

The present invention relates to a system for alignment between real and virtual objects in a head-mounted optical see-through display. In an embodiment, the system includes a tracking system including a processor, a headgear attached with the head-mounted optical see-through display, the 5 head-mounted optical see-through display includes at least two cameras mounted on a rigid frame, at least one object may be fixed or mobile including a plurality of marker points, the tracking system is operatively coupled to the headgear and the object, the processor is configured for: capturing two perspective images of the substantially circular entrance pupil of at least one 0 eye and relaying the image data to the processor, a memory device coupled to the processor and containing the geometric calibration data of the at least two cameras and the pre-calibrated transformation between the cameras. The processor extracts the boundary between the entrance pupil and the iris, calculates the projected center of the boundary in the individual images and 5 using the calibration data estimates the center of the entrance pupil in three dimensional space in relation to the cameras.

7 Claims, 8 Drawing Sheets

(52) U.S. Cl.
CPC .............. *G02B 2027/014* (2013.01); *G02B 2027/0138* (2013.01); *G02B 2027/0198* (2013.01)

(56) References Cited

U.S. PATENT DOCUMENTS

| | | | |
|---|---|---|---|
| 8,824,779 B1 * | 9/2014 | Smyth | G06T 7/73 |
| | | | 382/117 |
| 8,885,882 B1 * | 11/2014 | Yin | G06T 7/73 |
| | | | 382/103 |
| 2014/0333665 A1 | 11/2014 | Sylvan et al. | |
| 2016/0012643 A1 | 1/2016 | Kezele et al. | |

\* cited by examiner

SYSTEM AND METHOD FOR ALIGNMENT BETWEEN REAL AND VIRTUAL OBJECTS IN A HEAD-MOUNTED OPTICAL SEE-THROUGH DISPLAY

CROSS REFERENCE TO RELATED APPLICATIONS

This application is a National Stage Application of International Application Number PCT/IN2019/050395, filed May 16, 2019; which claims priority to Indian Application No. 201821018357, filed May 16, 2018.

FIELD OF THE INVENTION

The present invention relates generally to Head Mounted Displays, and particularly, but not exclusively, to optical see-through head-mounted displays. More particularly to a system and method for augmented reality calibration of see-through head-mounted displays in order to achieve usable and reliable real-virtual alignment.

BACKGROUND OF THE INVENTION

Virtual Reality (VR) is an artificial environment constructed by a computer that permits the user to interact with that environment as if the user were actually immersed in the environment. VR devices permit the user to see three-dimensional (3D) depictions of an artificial environment and to move within that environment. VR broadly includes Augmented Reality (AR) technology, which allows a person to see or otherwise sense a computer-generated virtual world integrated with the real world. The "real world" is the environment that an observer can see, feel, hear, taste, or smell using the observer's own senses. The "virtual world" is defined as a generated environment stored in a storage medium or calculated using a processor. There are a number of situations in which it would be advantageous to superimpose computer-generated information on a scene being viewed by a human viewer. Display systems that provide this feature are often referred to as "Augmented Reality" systems. Typically, these systems utilize a head-mounted display that allows the user's view of the real world to be enhanced or added to by "projecting" into it computer generated annotations or objects. For example, in medical applications, a surgeon can use an optical see-through head mounted display to visualize internal structures of the patient's anatomy rendered in free space as virtual objection floating above the patient during surgery instead of having a look at a distant monitor display.

Being able to visualize virtual objects in free space is useful. It is however, much more valuable to be able to present a virtual object superimposed on a counterpart real object. When performing tasks that require accessing real objects that are not directly visible to a user, it is valuable to be able to show a virtual object apparition of the real object, which is like giving the user "X-ray vision" ability to see beyond the occluding barrier. If the task requires precision it is important that the virtual object is closely registered with the true position and orientation of the hidden real object.

For example, in the operating room, a surgeon can be provided valuable information about the location of a tumour inside a patient's brain by presenting a virtual apparition of the tumour superimposed on the real patient, thus enabling the surgeon to plan an optimal approach path and surface incision that will minimize risk to the patient and improve the surgical outcome. It is important that the virtual apparition of the tumour be perceived by the surgeon to be at the exact location where the hidden real tumour is present, i.e. it should be visually registered.

Systems that can achieve satisfactory real-virtual alignment for any arbitrary viewer over large working volumes are limited or face multiple issues. Systems that do exist require elaborate user input for calibrating the position of the head-mounted-display (HMD) with respect to the viewer's eyes every time they wear the HMD, rendering quality of visual registration unreliable and inaccurate. These systems estimate the center of rotation of the viewer's eye in relation to the HMD, assuming that the once-calibrated position of the HMD on the viewer's head does not change with time.

The most widely accepted method for performing the manual calibration between the eye rotation centers and the HMD is the single point active alignment method (SPAAM), which requires positioning input from the viewer. The user is expected to hold their head or hand steady while performing precise pointing tasks in order to achieve a reasonably good calibration. Most often, this can provide only limited accuracy and bad repeatability because the quality of the calibration depends completely on the quality of user input. Additionally, even after the transformation has been calibrated once, if the display shifts in position on the viewer's head, the calibration between the display and the centers of eye rotation is lost, thus rendering the earlier calibration useless.

Moreover optically, the eye rotation center is not the true projection point of the human eye. Treating it to be so is an approximation. The estimation of the true projection point of the human eye is the position of the Stiles-Crawford Peak (SCP), which lies within the entrance pupil and is close to the geometric center of the entrance pupil.

To achieve perceptual superimposition of points in the three-dimensional real world with their virtual counterparts, the virtual points must be displayed in such a way that when projected they are equivalent to the real world points. The perceived direction of a point in the object space is determined by the location of the maximum photoreceptor response at the retina. To achieve projective equivalency, the rays from both the real and virtual object points which produce the maximum photoreceptor responses should align.

In the current state of art, light-fields that are produced by optical see-through display technology lack the complete fidelity that is contained in the light-fields generated by the real world. Current see-through displays span multiple technologies but are limited to generating light-fields with only a limited number of wavefront curvatures. This has the effect that the viewer can accommodate perfectly only on a single focal plane or a set of discrete focal planes provided by the display at any given instance.

The implication is that only a display signal generated for points on the set of display focal planes can form a point image on the retina. If the user's eye is not focused on one of the discrete focal planes, the image of a point is necessarily a blurred spot. Therefore, except for the special case when a real point object is at a display focal plane, real-virtual alignment essentially requires alignment of a real point object which is in sharp focus with a virtual point object which is blurred to some extent.

The photoreceptors of the human eye responsible for high resolution foveal vision are cone cells whose responses show a high dependence on the angle of incident light. Since the intensity distribution across a blurred image spot is almost uniform, it is the angle of the incoming rays which decides the location of the maximum response. The lines of maximum angular response of all the foveal photoreceptors converge substantially to a point in the exit pupil, the object side conjugate of which is called the Stiles-Crawford Peak position (SCP). Thus, the ray which determines the perceived direction of a point object in the object space is the one that passes through the Stiles-Crawford peak (SCP) position making the Stiles-Crawford peak (SCP) position the true projection point of the human eye.

Unlike the eye rotation center, the true projection point of the eye changes with eye movement and cannot be assumed to be stationary with respect to the HMD. Although there exists considerable discussion on eye tracking systems in prior arts, these systems are majorly concerned with estimating either gaze directions, or eye poses derived from anthropomorphic human eye models.

Existing arts fail to achieve usable and reliable real-virtual alignment systems and/or methods that can achieve satisfactory visual registration over a wide working range and especially at small working distance from the viewer. Thus, there is a need in the art for a method and system of alignment between real and virtual objects in a head-mounted optical see-through display.

SUMMARY OF THE INVENTION

An aspect of the present invention is to address at least the above-mentioned problems and/or disadvantages and to provide at least the advantages described below.

Accordingly, in one aspect, the present invention provides a method of alignment between real and virtual objects in a head-mounted optical see-through display by estimating 3D location of the projection point of a user eye. The method includes the steps of acquiring at least two images of an eye of a user from two or more image capturing devices attached to the display. Steps also include estimating a three dimensional pupil contour from the at least two images of the eye, a geometric calibration data of the two or more imaging devices and, a pre-calibrated geometrical transform data between the two or more image capturing devices and estimating a geometric center of the extracted three dimensional pupil contour and using the same as a projection point.

In another aspect of the present invention a method of alignment between real and virtual objects in a head-mounted optical see-through display by acquiring at least two images of an eye of the user from two or more image capturing devices attached to the display is disclosed. Further, extracting elliptical pupil contours from the at least two images of the eye that are acquired takes place.

Further steps include, converting the extracted elliptical pupil contours from the at least two images of the eye into a fronto-parallel form and estimating an Stiles-Crawford Peak (SCP) position each in the fronto-parallel form of the at least two images of the eye using a reference iris image containing a calibrated reference image Stiles-Crawford Peak (SCP) position. Then, calculating location of an actual Stiles-Crawford Peak (SCP) position in three dimension using the estimated Stiles-Crawford Peak (SCP) position each in the fronto-parallel form of the at least two images of the eye, the geometric calibration data of the two or more imaging devices and, a pre-calibrated geometrical transform data between the two or more image capturing devices takes place. This location of the actual Stiles-Crawford Peak (SCP) position in three dimensional space may then be used as the projection point.

Yet another aspect of the present invention provides a system for alignment between real and virtual objects in a head-mounted optical see-through display having an eye tracking device. The system including a processor, at least two cameras mounted on a rigid frame and capturing two perspective images of the substantially circular entrance pupil of at least one eye and relaying the image data to the processor and a memory device coupled to the processor and containing the geometric calibration data of the at least two cameras and the pre-calibrated transformation data between the cameras is disclosed. In one embodiment, the processor is configured to extract a three dimensional pupil contour, using the geometric calibration data and the pre-calibrated transformation data and calculate the center of three dimensional pupil contour to be used as a projection point. In one embodiment, the processor extracts the boundary between the entrance pupil and the iris, calculates the projected center of the boundary in the individual images and using the calibration data estimates the center of the entrance pupil in three dimensional space in relation to the cameras, the coordinates of the real object in relation to the cameras are known and said known coordinates of the real object and if the calibrated position of the Stiles-Crawford peak (SCP) position is not available, the position of the center of the entrance pupil are used to calculate an input signal to the display corresponding to the at least one eye such that the display produces rays corresponding to the virtual object that substantially overlap with the corresponding rays from the real object when incident on the pupil.

In one embodiment, a tracking system configured to obtain a real-time coordinates of a real object and, the processor is further configured to receive said real-time coordinates of the real object and the projection point to calculate an input signal to the display corresponding to the at least one eye such that the display produces rays corresponding to the virtual object that substantially overlap with the corresponding rays from the real object when incident on the pupil is provided.

In yet another aspect of the present invention provides a system for alignment between real and virtual objects in a head-mounted optical see-through display. The system including a tracking system including a processor, a headgear attached with the head-mounted optical see-through display, the head-mounted optical see-through display includes at least two cameras mounted on a rigid frame, at least one object may be fixed or mobile including a plurality of marker points, the tracking system is operatively coupled to the headgear and the object, the processor is configured for: capturing two perspective images of the substantially circular entrance pupil of at least one eye and relaying the image data to the processor, a memory device coupled to the processor and containing the geometric calibration data of the at least two cameras and the pre-calibrated transformation data between the cameras, the processor extracts the boundary between the entrance pupil and the iris, calculates the projected center of the boundary in the individual images and using the calibration data estimates the center of the entrance pupil in three dimensional space in relation to the cameras, the coordinates of the real object in relation to the cameras are known and said known coordinates of the real object and if the calibrated position of the Stiles-Crawford peak (SCP) position is not available, the position of the center of the entrance pupil are used to calculate an input signal to the display corresponding to the at least one eye such that the display produces rays corresponding to the virtual object that substantially overlap with the corresponding rays from the real object when incident on the pupil.

In one embodiment, the processor is remotely available with respect to the frame. In another embodiment, the processor is available with the frame. Further, in another embodiment a part of the processing may be done remotely and another part in physical proximity of the frame, where a part of the processor is present. Also, the memory may be located remotely, locally or partly remotely.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
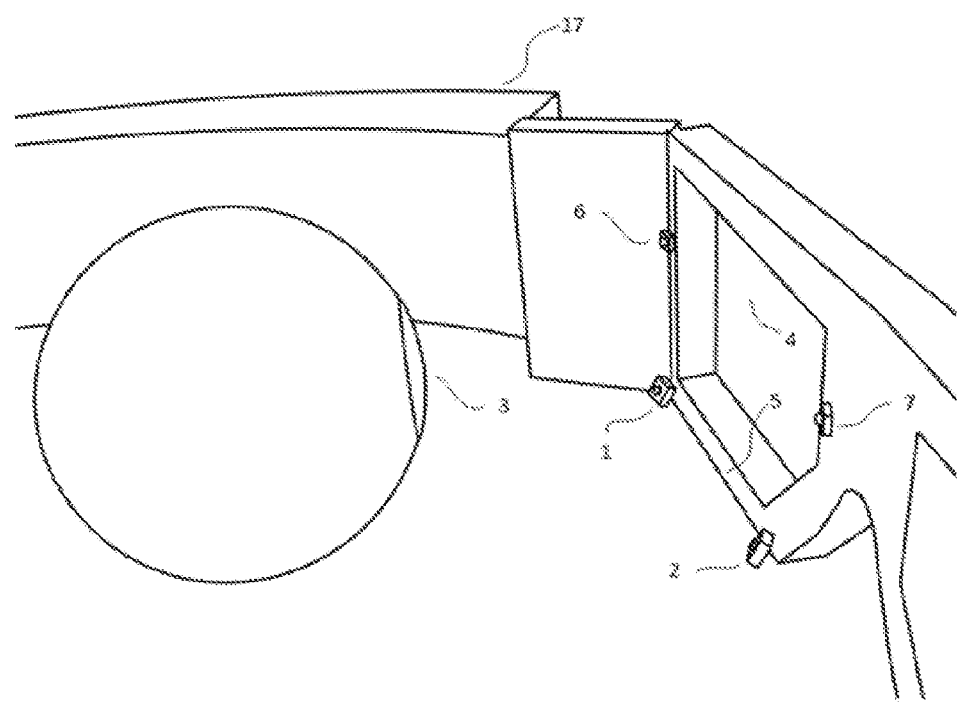
FIG. 1 shows a schematic rear view of a head mounted display apparatus according to an embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated. Also, alignment between real and virtual objects described also include scenarios of alignment between a real object and a virtual object.

The head mounted display in this embodiment is an optical see-through head-mounted display device with which a user can visually recognize a virtual image and at the same time directly visually recognize an external scene. The head mounted display includes an image display unit that causes the user to visually recognize a virtual image in a state in which the image display unit is mounted on the head of the user and a control unit (a controller) that controls the image display unit. The image display unit is a mounted member mounted on the head of the user. In this embodiment, the image display unit has an eyeglass shape. The head-side light emitting unit and the head-side light receiving unit are arranged to be adjacent to each other on the front surface of a housing forming the optical panel.

Referring to FIG. 1 which shows a schematic rear view of a head mounted display according to a particular embodiment of the present invention. In an example embodiment, the display including one or more image capturing devices i.e. two cameras 1 and 2 observing the user's eye 3. Both the cameras may be rigidly mounted on the frame 5 of an optical see-through head mounted display 17. The cameras 1 and 2 are pre-calibrated and the calibration data is stored in memory. The geometric transformation between them after they have been rigidly mounted on 5 is pre-calibrated as well, and stored in memory. The calibration data of the cameras 1 and 2 includes focal lengths, principal points and distortion parameters. The geometric transformation between the two cameras could be represented either as an affine transformation between the coordinate systems of cameras 1 and 2 or as an essential matrix.

The display also including one or more illuminating sources 6 and 7 which may be illuminated by narrow-band wavelength towards user's eye. The narrow band wavelength may be in the near infrared spectrum. In an example embodiment, the illumination sources may have an emission wavelength substantially centred about a central wavelength in the range of 750-960 nm. The cameras 1 and 2 may have optical filters which can be band-pass optical filters that substantially pass wavelengths that overlap with the emission wavelengths of illuminating sources 6 and 7 and suppress all other wavelengths. Alternatively, cameras 1 and 2 may have optical filters which are high-pass optical filters that pass all wavelengths higher than the wavelengths of illuminating sources 6 and 7 and suppress the lower ones. The display 17 may generate a display signal that is comprised of wavefronts having a single predetermined curvature or one or multiple of a sparse set of predetermined curvatures. Although the invention describes at least two camera eye-tracking system, a person skilled in the art can understand using this system and method for tracking the location of entrance pupil centre and the Stiles-Crawford peak (SCP) position using a single eye-tracking camera attached to the display. This setup maybe similar to the two camera setup—it involves similar infrared illumination sources and likewise, the single camera has a bandpass or high pass filter to only selectively allow light from the illumination sources.

Figure 2:
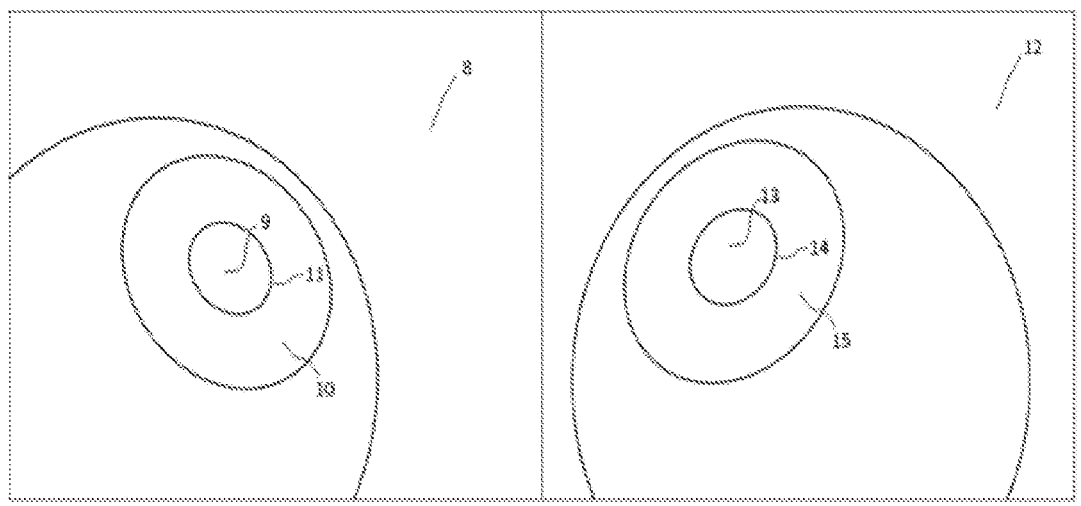
FIG. 2 shows an images of the eyes acquired by the head mounted display apparatus according to embodiment of the present invention.

Referring to FIG. 2, which shows images of the eyes acquired by the head mounted display apparatus according to an embodiment of the present invention. The images 8 and 12, which are acquired by cameras 1 and 2 from two distinct perspectives respectively, as shown as an example. Images 8 and 12 contain areas 10 and 15, which correspond to the iris; areas 9 and 13, which correspond to the pupil; and contours 11 and 14, which correspond to the boundary between the pupil and the iris. A processor coupled to the cameras analyses 8 and 12 to digitally extract the contours 11 and 14.

Figure 3:
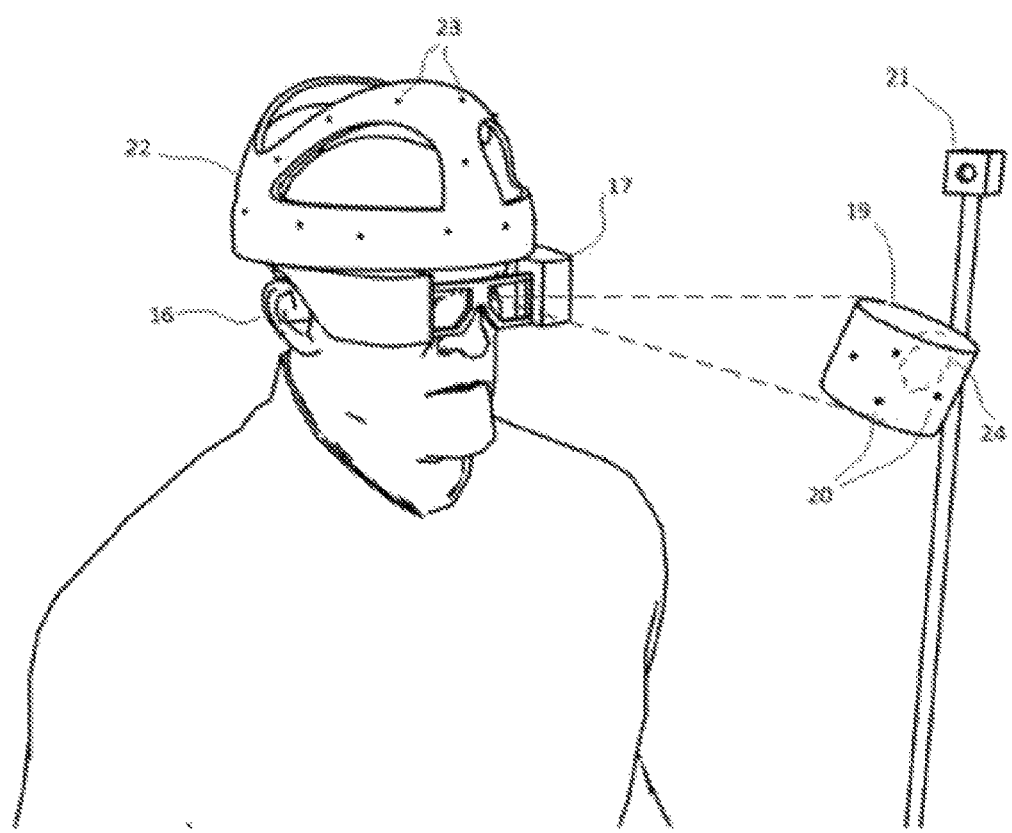
FIG. 3 shows a schematic front and side view of a user's head having a head mounted display apparatus of a mobile tracking system according to an embodiment of the present invention mounted thereon.

Referring to FIG. 3 shows a schematic front and side view of a user's head having a head mounted display apparatus having a mobile tracking system according to a particular embodiment of the present invention mounted thereon. The head mounted display apparatus includes a headgear 22 which is rigidly attached to the head mounted display 17. The headgear 22 having a plurality of marker points 23 at fixed pre-calibrated locations on it. 21 and 22 comprise an inside out optical tracking system. 21 is part of a single or multiple camera based tracking system that can determine the 6 degrees of freedom pose of 22 utilizing the pre-calibrated marker position information. A rigid relation exists between the coordinate systems of 22, 1 and 2 and the transformations between them are pre-calibrated and stored in memory. The object 19 may be fixed or mobile and has marker points 20, at fixed pre-calibrated locations on it. The tracking system 21 tracks the 6 degrees of freedom poses of both 22 and 19. Since the geometric transform between 19 and 22 is known by the means of tracking and the pre-calibrated transformation between 22, 1 and 2 is known as well, the geometric transform between the object 19 and 1 or 2 can be calculated. Since the projection point is also known in the coordinate systems 1 and 2, the real object and the projection point are known in the same reference frame. With the estimated projection point, a display signal is constructed using the graphics projection pipeline with pre-calibrated parameters for the geometrical display calibration. If all the measured transforms are accurate, the user perceives alignment between 19 and a virtual object superimposed on 19. In a preferred embodiment, a virtual object apparition 24, which corresponds to a feature inside 19 may be displayed to the user to provide the so-called "X-ray vision" capability.

Figure 4:
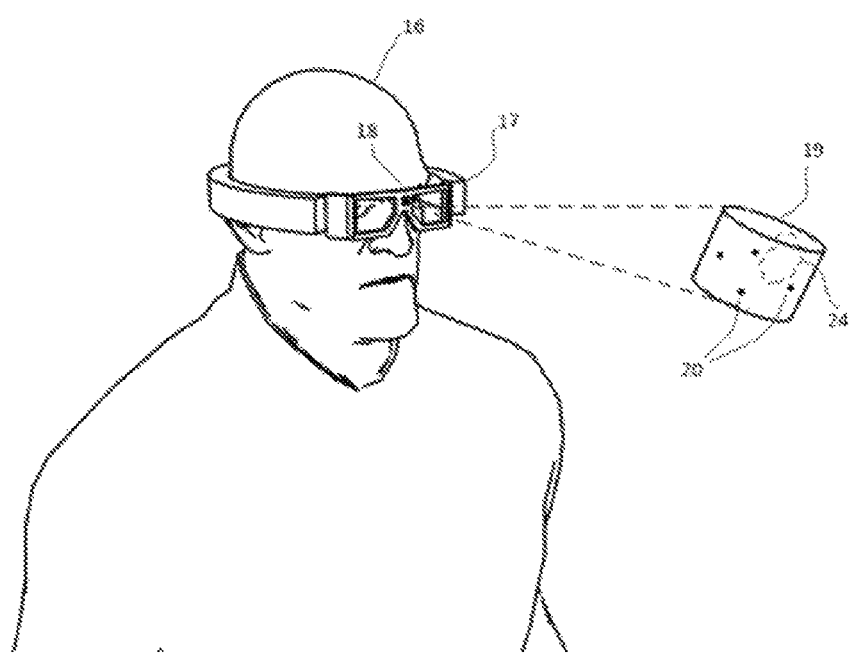
FIG. 4 shows a schematic front and side view of a user having a head mounted display apparatus of a mobile tracking system according to an embodiment of the present invention.

Referring to FIG. 4, another embodiment of a mobile alignment system is shown 18 may be one or more video cameras and/or one or more depth cameras that are rigidly mounted on 17, and being coupled to a processor comprises an inside-out tracking system. 18 is pre-calibrated and its calibration data is stored in memory. The geometric transform between 18 and 17 is pre-calibrated as well and stored in memory. The geometric transform between 18, 1 and 2 is pre-calibrated in advance and stored in memory. Unlike in FIG. 3, there is no external tracking system present. The fixed or mobile real object 19 is tracked directly by 18 utilizing the markers 20 as key points. Since the geometric transform between 18, 1 and 2 is known, the transform between 19 and 1 or 2 can be calculated. Like in FIG. 3, the estimated projection point and the real object are known in the same reference frame. With the estimated projection point, a display signal is constructed using the graphics projection pipeline with pre-calibrated parameters for the geometrical display calibration.

Figure 5:
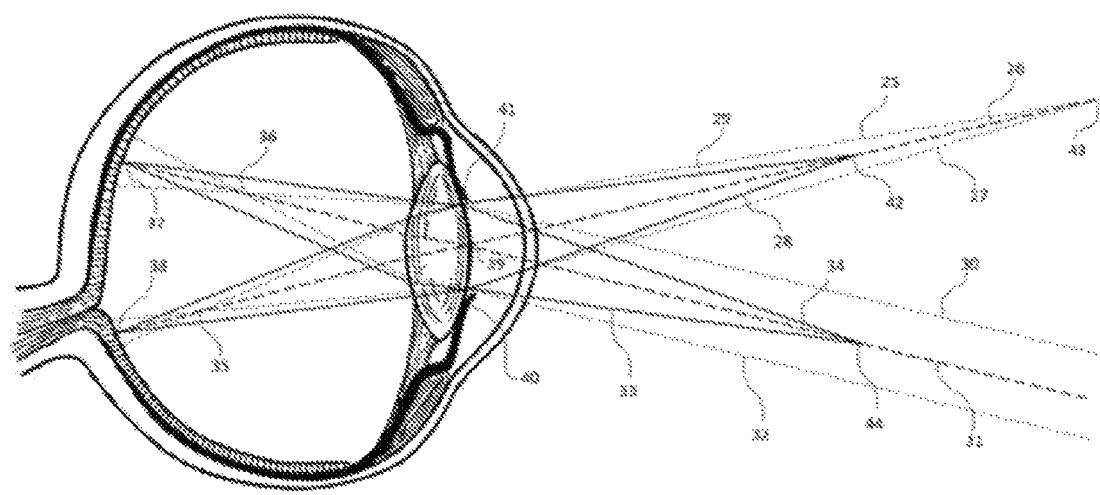
FIG. 5 shows a schematic of the human eye along with an optical ray diagram according to one embodiment of the present invention.

Referring to FIG. 5, a schematic of the human eye is shown along with an optical ray diagram. 42 and 44 are real object points and are on the plane in the object space that the eye is focused at. 28 and 29 are the marginal rays emanating from 42 that enter the pupil 40 and 41, and go on to converge at the retina at 38. In one embodiment, the display is able to generate a wavefront which originates from the virtual point 43 such that 25 and 27 are the marginal rays. They enter the pupil at 41 and 40 and go on to converge at 35 and then diverge to form a circle of confusion at the retina containing 38 within. The user will perceive 38 to be aligned with a virtual point if 43 is positioned such that 39, 42 and 43 are collinear, where 39 is the Stiles-Crawford peak (SCP) position and 26 is the ray corresponding to the maximum photoreceptor response. Further, 33 and 34 are the marginal rays emanating from 44 that enter the pupil at 40 and 41 and go on to converge at the retina at 37. In another embodiment, the display is able to only generate collimated rays so that a single predetermined display focal plane is at optical infinity. In order for the user to perceive a virtual point aligned with 44, the virtual point must be along the same direction as the line joining 44 and 39, which is the Stiles-Crawford peak (SCP) position. The marginal rays along that direction 30 and 32 will then enter the pupil 41 and 42, go on to converge at 36 and then diverge to form a circle of confusion at the retina containing 36 within. The maximum intensity ray 31 will pass through 39 and be coincident on the retina at 37.

Figure 6:
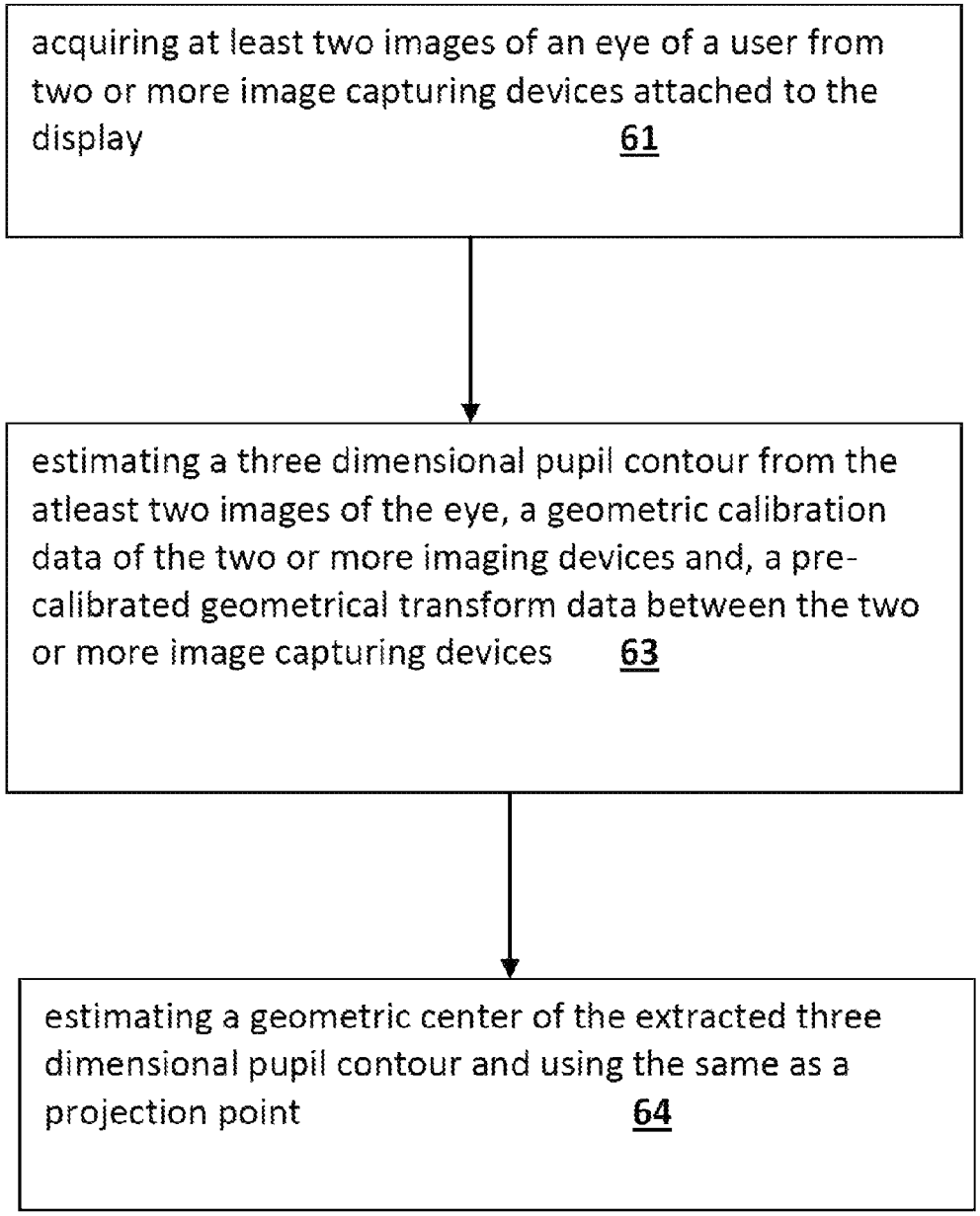
FIG. 6 shows a flow chart of a method of alignment between real and virtual objects in a head-mounted optical see-through display by estimating a three dimentional (3D) location of the projection point of a user eye, according to one embodiment of the present invention.

Referring to FIG. 6, which describes a flowchart of a method of alignment between real and virtual objects in a head-mounted optical see-through display by estimating 3D location of the projection point of a user eye. At step 61, the method acquiring at least two images of an eye of a user from two or more image capturing devices attached to the display. The image capturing device is a camera which may be a high frame rate CMOS camera with a bandpass or high-pass optical filter to selectively allow only those wavelengths that are emitted by the illuminating source. Under off-axis infrared illumination the pupil appears as a dark circular/elliptical spot with high contrast against the background while under on-axis illumination appears brighter than the background. This helps to detect and delineate the pupil boundary in the next step.

At step 63, estimating a three dimensional pupil contour from the at least two images of the eye, a geometric calibration data of the two or more imaging devices and, a pre-calibrated geometrical transform data between the two or more image capturing devices. In one exemplary embodiment the three dimensional pupil contour estimation may further comprise of extracting an elliptical pupil contour each from the acquired at least two images of the eye. Pupil region may be delineated from its background by techniques for example but not limited to adaptive thresholding followed by ellipse fitting to the boundary of the segmented region. The method further transforms the extracted elliptical pupil contours into normalized coordinates using pre-calibrated camera intrinsics. Normalized coordinates make the pupil contour coordinates independent of the camera focal length and distortion.

In one exemplary embodiment, estimating the three dimensional pupil contour may include assuming the 3D contour to be circular with an unknown radius, 3D orientation and 3D position and then estimating these parameters by finding the plane which cuts the conics generated by the 2D ellipses and their respective camera centres such that the intersection curves are circles.

At step 64, the method estimates the geometric center of the extracted 3D pupil contour and uses the same as a projection point takes place. In one embodiment this is preconditioned on unavailability of user Stiles-Crawford Peak (SCP) calibration data.

Figure 7:
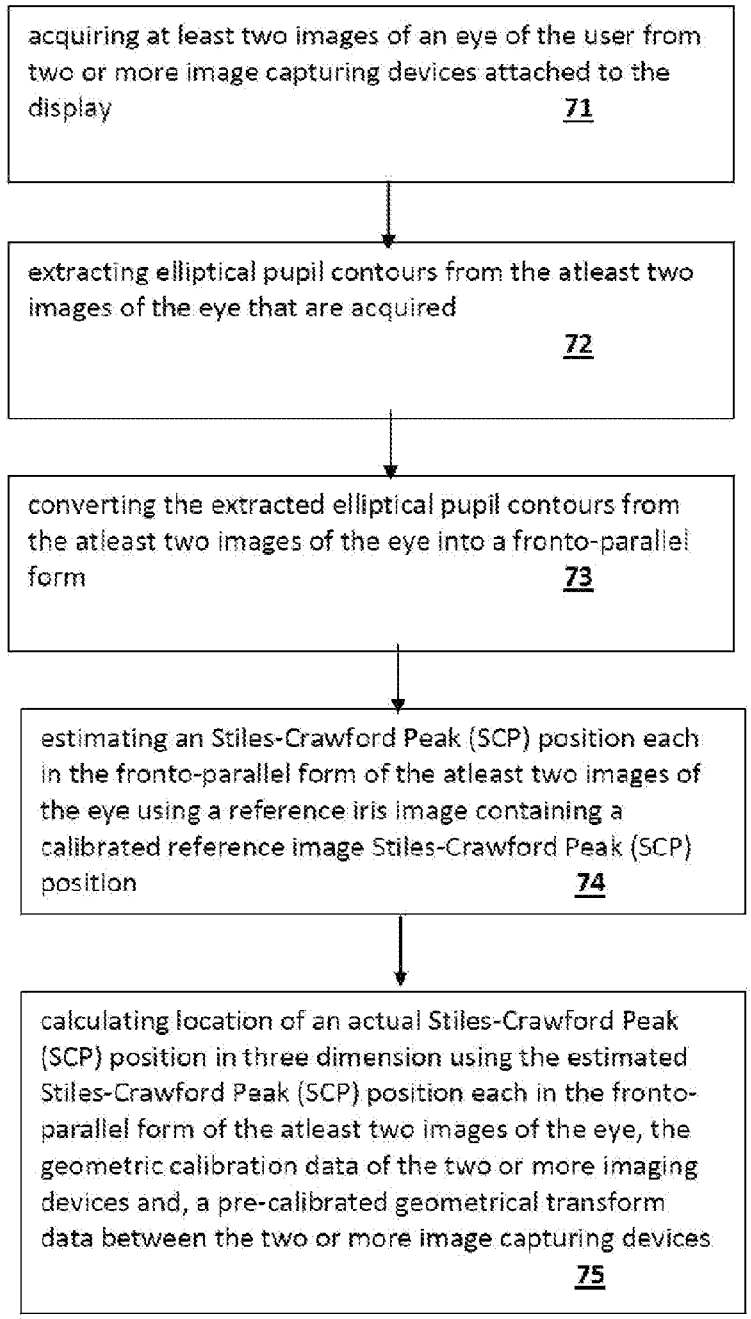
FIG. 7 shows a flow chart of a method of alignment between real and virtual objects in a head-mounted optical see-through display by estimating 3D location of the projection point of a user eye, according to another embodiment of the present invention.

Referring to FIG. 7, describes a method of alignment between real and virtual objects as per an embodiment herein. At step 71, the method includes acquiring at least two images of an eye of the user from two or more image capturing devices attached to the display. Under off-axis infrared illumination the pupil appears as a dark circular/elliptical spot with high contrast against the background while under on-axis illumination appears brighter than the background. This helps to detect and delineate the pupil boundary in the next step.

At step 72, the method extracts elliptical pupil contours from the acquired images of the eye. In one embodiment this may be done in image coordinates. Pupil region may be delineated from its background by techniques for example but not limited to adaptive thresholding followed by ellipse fitting to the boundary of the segmented region. In one embodiment, the method may further include transforming the extracted elliptical pupil contours into normalized coordinates using the pre-calibrated camera data. The calibration data may be stored in the camera itself or it can be stored on a processing unit of the system or on the server at a remote network location. Normalized coordinates make the pupil contour coordinates independent of the camera focal length and distortion. In one embodiment, at step 73 converting the extracted elliptical pupil contours from the at least two images of the eye into a fronto-parallel form takes place.

In one embodiment, the method estimates the 3D pupil contour from the normalized coordinates and the pre-calibrated geometrical transform between the image capturing devices. This can be done, for example, by assuming the 3D contour to be circular with an unknown radius, 3D orientation and 3D position and then estimating these parameters by finding the plane which cuts the conics generated by the 2D ellipses and their respective camera centres such that the intersection curves are circles. In one embodiment, the method may estimate a position and orientation of a reference iris image in 3D space, such that it homographically maps to the acquired images of the eye; wherein the reference iris image is retrieved with the calibrated Stiles-Crawford Peak (SCP) position.

Alternatively, the 3D pupil contour can be estimated from the acquired images by first computing a depth map of the scene followed by directly mapping the extracted pupil contour from one of the images to 3D space using the pixel values from the depth map.

Further, in one embodiment at step 74, estimating an Stiles-Crawford Peak (SCP) position each in the fronto-parallel form of the at least two images of the eye using a reference iris image containing a calibrated reference image Stiles-Crawford Peak (SCP) position takes place. In one example embodiment, the method generates a fronto-parallel image of the pupil from the acquired images of the eye. The fronto-parallel image is generated by placing a simulated camera with an optical axis coincident with the axis of the circular 3D pupil and at a predetermined distance from the pupil, and generating a simulated image, wherein the pupil necessarily appears as a circle rather than an ellipse. The method extracts an iris pattern from the generated fronto-parallel image in polar coordinates centered about the geometric center of the circular pupil. The method also extracts a reference iris pattern from the reference iris image in polar coordinates centered about the geometric center of the entrance pupil. An alignment between the extracted iris pattern and reference iris pattern is estimated in the form of a 2D rotation. One way to estimate the 2D rotation is by searching for the maximum value in the cross-correlation image of the extracted and reference iris patterns. The method first positions the reference iris image on the 3D pupil contour plane constraining its orientation to be same as the generated fronto-parallel image and the center of the pupil in the reference iris image to be coincident with the geometric center of the 3D pupil contour, and then applies the estimated 2D rotation to calculate the final position and orientation of the reference iris image in 3D space.

In another example embodiment, the method constrains the reference iris image in the estimated 3D pupil contour plane such that the pupil geometric center in the reference iris image coincides with the geometric center of the estimated 3D pupil contour. Further, the method homographically maps the reference iris image to the left and right camera planes for a given 2D rotation of the reference iris image about the axis of the pupil and computes simulated reference iris image. The method iteratively computes the correlation between simulated reference iris images and the acquired images of the eye for different 2D rotation values and estimates the 2D rotation as the value that maximizes the correlations. The method applies the estimated 2D rotation to the constrained reference iris image to calculate its final position and orientation in 3D space.

In another example embodiment, the method transforms the at least two images to the fronto-parallel plane using the extracted 2D elliptical pupil contours. Further, the method iteratively computes the correlation between the reference iris image and the fronto-parallely transformed left and right images for different 2D rotation values and estimates the 2D rotation values that maximize the correlations for each of the fronto-parallely transformed left and right camera images. In the next step, the 2D locations of the Stiles-Crawford peak (SCP) position in each of the acquired left and right images are computed from the calibrated Stiles-Crawford peak (SCP) position in the reference image by inverting the fronto-parallel transformation. Finally, the 2D locations of the Stiles-Crawford peak (SCP) position in each of the acquired left and right images are used to estimate the 3D location of the Stiles-Crawford peak (SCP) position through triangulation.

At step 75, calculating location of an actual Stiles-Crawford Peak (SCP) position in three dimension using the estimated Stiles-Crawford Peak (SCP) position each in the fronto-parallel form of the at least two images of the eye, the geometric calibration data of the two or more imaging devices and, a pre-calibrated geometrical transform data between the two or more image capturing devices.

Figure 8:
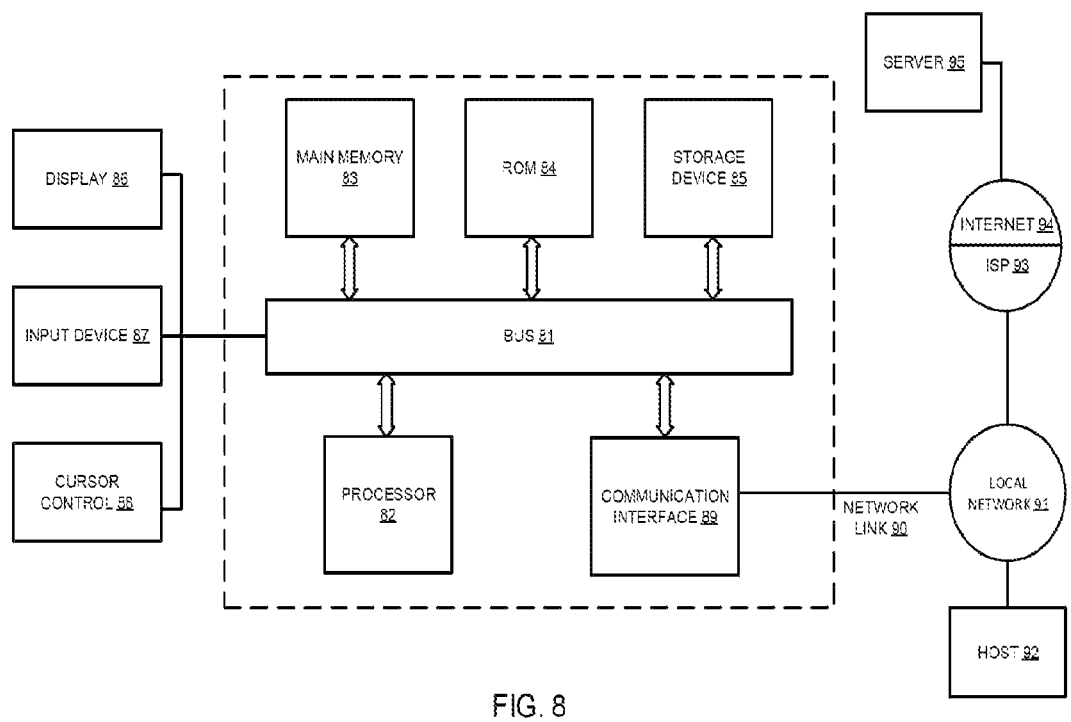
FIG. 8 shows a block diagram that illustrates a computer system upon which an embodiment of the invention may be implemented.

FIG. 8 shows a block diagram that illustrates a computer system upon which an embodiment of the invention may be implemented. Computer system includes a bus 81 or other communication mechanism for communicating information, and a processor 82 coupled with bus 81 for processing information. Computer system also includes a main memory 83, such as a random access memory (RAM) or other dynamic storage device, coupled to bus for storing information and instructions to be executed by processor 82. Main memory also may be used for storing temporary variables or other intermediate information during execution of instructions to be executed by processor. Computer system further includes a read only memory (ROM) 84 or other static storage device coupled to bus for storing static information and instructions for processor. A storage device 85, such as a magnetic disk or optical disk, is provided and coupled to bus for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system may be coupled via bus to a display 86, such as a liquid crystal display (LCD), for displaying information to a computer user. An input device 87, including alphanumeric and other keys, is coupled to bus for communicating information and command selections to processor. Another type of user input device is cursor control 88, such as a mouse, a trackball, a trackpad, or cursor direction keys for communicating direction information and command selections to processor and for controlling cursor movement on display 86. This input device typically has two degrees of freedom in two axes, a first axis (e.g., x) and a second axis (e.g., y), that allows the device to specify positions in a plane. Input devices may also include wireless or wired tracked tools having buttons for user interaction. These input devices typically have six degrees of freedom (3 rotation and 3 translation) and can be used for interacting with virtual objects.

As discussed above, the present invention provides an alternate or supplemental user input system and method, which may advantageously be used in conjunction with other user interface functions which employ the same camera or cameras.

The invention is related to the use of computer system for implementing the techniques described herein. According to one embodiment of the invention, those techniques are performed by computer system in response to processor executing one or more sequences of one or more instructions contained in main memory. Such instructions may be read into main memory from another machine-readable medium, such as storage device. Execution of the sequences of instructions contained in main memory causes processor to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system, various machine-readable media are involved, for example, in providing instructions to processor for execution. Such a medium may take many forms, including but not limited to, non-volatile media, volatile media, and transmission media. Non-volatile media includes, for example, semiconductor devices, optical or magnetic disks, such as storage device. Volatile media includes dynamic memory, such as main memory. Transmission media includes coaxial cables, copper wire and fiber optics, including the wires that comprise bus. Transmission media can also take the form of acoustic or light waves, such as those generated during radio-wave and infra-red data communications. All such media must be tangible to enable the instructions carried by the media to be detected by a physical mechanism that reads the instructions into a machine. Wireless or wired communications, using digitally modulated electromagnetic waves are preferred.

Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, a carrier wave as described hereinafter, or any other medium from which a computer can read. Various forms of machine-readable media may be involved in carrying one or more sequences of one or more instructions to processor for execution.

For example, the instructions may initially be carried on a magnetic disk of a remote computer. The remote computer can load the instructions into its dynamic memory and send the instructions over the Internet through an automated computer communication network. An interface local to computer system, such as an Internet router, can receive the data and communicate using a wireless Ethernet protocol (e.g., IEEE-802.11n) to a compatible receiver, and place the data on bus. Bus carries the data to main memory, from which processor retrieves and executes the instructions. The instructions received by main memory may optionally be stored on storage device either before or after execution by processor.

Computer system also includes a communication interface 89 coupled to bus 81. Communication interface provides a two-way data communication coupling to a network link 90 that is connected to a local network 91. For example, communication interface may be an integrated services digital network (ISDN) card or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For example, network link may provide a connection through local network to a host computer 92 or to data equipment operated by an Internet Service Provider (ISP) 93. ISP in turn provides data communication services through the world wide packet data communication network now commonly referred to as the "Internet" 94. Local network 91 and Internet 94 both use electrical, electromagnetic or optical signals that carry digital data streams. The signals through the various networks and the signals on network link and through communication interface, which carry the digital data to and from computer system, are exemplary forms of carrier waves transporting the information.

Computer system can send messages and receive data, including program code, through the network(s), network link and communication interface. In the Internet example, a server might transmit a requested code for an application program through Internet, ISP, local network and communication interface.

In this description, several preferred embodiments were discussed. It is understood that this broad invention is not limited to the embodiments discussed herein, but rather is composed of the various combinations, sub-combinations and permutations thereof of the elements disclosed herein. The invention is limited only by the following claims.

Alternatively to the case of a head-mounted tracking camera, external tracking means can be used in conjunction with head-mounted markers or sensors that are rigidly fixed with respect to the illuminator.

Having described embodiments for a system and method for aligning real and virtual views, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

The invention claimed is:

1. A method of alignment between real and virtual objects in a head-mounted optical see-through display, the method comprising:

acquiring at least two images of an eye of the user from two or more image capturing devices attached to the display;

extracting elliptical pupil contours from the at least two images of the eye that are acquired;

converting the extracted elliptical pupil contours from the at least two images of the eye into a fronto-parallel form, estimating an Stiles-Crawford Peak (SCP) position each in the fronto-parallel form of the at least two images of the eye using a reference iris image containing a calibrated reference image Stiles-Crawford Peak (SCP) position;

calculating location of an actual Stiles-Crawford Peak (SCP) position in three dimension using the estimated Stiles-Crawford Peak (SCP) position each in the fronto-parallel form of the at least two images of the eye, the geometric calibration data of the two or more imaging devices and, a pre-calibrated geometrical transform data between the two or more image capturing devices; and using the said location of the actual Stiles-Crawford Peak (SCP) position in three dimensional space as the projection point.

2. The method of claim 1, wherein the reference iris image is captured in the fronto-parallel view along with the calibrated Stiles-Crawford Peak (SCP) position, and stored in memory as biometric and calibration data for the each user or viewer.

3. The method of claim 1, wherein the two or more image capturing devices are mounted on a frame of the optical see-through head mounted display, wherein each of the two or more image capturing devices are pre-calibrated and the calibration data are stored in a memory and further the geometric transformation between two or more image capturing devices after they have been rigidly mounted on the frame is also pre-calibrated and stored in the memory.

4. The method of claim 1, wherein the optical see-through head mounted display includes a plurality of illuminating sources which illuminate in narrow-band wavelength, and wherein the narrow band wavelength is in the near infrared spectrum.

5. The method of claim 1, wherein the image capturing device includes an optical filter which is a band-pass optical filter that passes wavelengths that overlap with the emission wavelengths of illuminating sources and suppresses all other wavelengths.

6. The method of claim 1, wherein the image capturing device includes an optical filter which is a high-pass optical filter that substantially passes wavelengths which are higher than the wavelengths of illuminating sources and suppresses the lower ones.

7. The method of claim 1, wherein the optical see-through head mounted display generates a display signal comprised of wavefronts having a single curvature or one or multiple of a sparse set of curvatures.

* * * * *